United States Patent [19]

Schlafly et al.

[11] Patent Number: 5,297,208

[45] Date of Patent: Mar. 22, 1994

[54] SECURE FILE TRANSFER SYSTEM AND METHOD

[76] Inventors: Roger Schlafly, P.O. Box 1680, Soquel, Calif. 95073; Michael J. Markowitz, 1115 N. East Ave., Oak Park, Ill. 60302

[21] Appl. No.: 926,125

[22] Filed: Aug. 5, 1992

[51] Int. Cl.$^5$ ............................................. H04L 9/00
[52] U.S. Cl. ........................................ 380/49; 380/21; 380/48; 380/25
[58] Field of Search .................... 380/23, 24, 25, 29, 380/30, 46, 47, 48, 49, 3, 4, 50

[56] References Cited

U.S. PATENT DOCUMENTS

| | | | |
|---|---|---|---|
| 4,322,576 | 3/1982 | Miller | 380/48 |
| 4,432,287 | 12/1983 | Zeidler | 380/25 X |
| 4,933,971 | 6/1990 | Bestock et al. | 380/24 X |
| 5,117,458 | 5/1992 | Takaragi et al. | 380/4 |
| 5,121,429 | 6/1992 | Guppy et al. | 380/30 |
| 5,161,194 | 11/1992 | Ujiie | 380/48 |

Primary Examiner—Tod R. Swann

[57] ABSTRACT

This invention is a system and method for securely and robustly transferring a file from one computer to another without having a prearranged encryption key. Data is transferred by first generating some random numbers on each computer and undertaking some cryptographically secure handshaking in which a session key is determined. Then the file is broken up into blocks and encrypted with a chaining block cipher and transmitted. The blocks have headers which identify the them, and allow for detection and correction of transmission errors. Before retransmitting a block, an initialization vector is sent to synchronize the cipher modules. The random numbers are generated with keystroke timings combined with a pseudorandom number generator to expand the supply.

20 Claims, 2 Drawing Sheets

SECURE FILE TRANSFER SYSTEM AND METHOD

REFERENCES

U.S. Pat. No. 4,200,770, by Hellman et al (Stanford).
U.S. Pat. No. 5,117,458, by Takaragi et al (Hitachi).
U.S. Pat. No. 5,161,194, by Ujiie (NEC).
U.S. Pat. No. 4,423,287, by Zeidler (Visa).
U.S. Pat. No. 4,322,576, by Miller (Racal-Milgo).
U.S. Pat. No. 5,121,429, by Guppy et al (British Aerospace).
U.S. Pat. No. 4,933,971, by Bestock et al (Tandem).

BACKGROUND

This invention relates to computer communications.

Communications channels are commonly used to transfer data from one computer to another. These channels might use coaxial cable, telephone lines, or radio waves.

Frequently, the computers are secure in that they can be locked up and access can be limited to authorized persons. But the communications channels which connects them may not be secure. An eavesdropper with access to the wires or airwaves can monitor and record messages exchanged by the computers.

There are various methods in the prior art for establishing secure communications. One is to limit access to the communications channel. Another is to encrypt files that are sent on the channel.

A drawback to file encryption is that it usually requires the user to remember a password, or to transmit a key or password to another user.

U.S. Pat. No. 4,200,770 describes a method for exchanging keys for secure transmissions. The mathematical technicalities are as follows. Select a large prime P and a number G which generates the full group of units mod P or a sufficiently large subgroup thereof. When computers A and B wish to exchange data, they choose random numbers a and b, respectively. A sends $G \wedge a$ mod P to B, and B sends $G \wedge b$ mod P to A. Both can then compute $G \wedge (ab)$ mod P and use it as a cryptographic key. This method is commonly referred to as Diffie-Hellman key exchange.

Ideally, such a system of generating keys would be built into a computer network so that all of the network traffic is secure. However, it is difficult to implement such security in an existing network because it has to implemented at a low level and networks tend to have diverse and complicated compatibility requirements.

Furthermore it is often the case that not all of the network traffic has to be secure from eavesdroppers, but only selected files which have to be transmitted. In that case, file encryption protocols are much more easily implemented, and meet the security requirements. But they have the disadvantage that the user has to deal with passwords. Usually the user sending the file has to take the extra step to enter the password, memorize it, and tell the user at the other end who must also take an extra step to enter the password and decrypt the file.

In the prior art, encryption methods can operate with or without feedback. The feedback idea is as follows. Encryption of a long message usually proceeds sequentially from the beginning of the message to the end, a few bits or bytes at a time. At each stage, it is possible to modify the cryptographic key or next plaintext block based on previous bits in the message. This modification is called cipher feedback. It is sometimes also called chaining.

In practice it is often convenient to distinguish between the original cryptographic key and the accumulation of feedback changes. The mechanism for doing this is to maintain an auxiliary vector in addition to the key. The cipher feedback affects the vector, but not the original key. Both the key and the vector are used to encrypt the message. The vector must be initialized somehow, but its initial value does not need to be secret.

Encryption methods with cipher feedback have the advantage that they are much more secure. For example, feedback prevents repeated plaintext blocks from showing up as repeated ciphertext blocks. Conceptually, it can be regarded as using the message itself to lengthen the password. The method works because decryption is also sequential, and portions of the message are decrypted before they are needed to modify the cryptographic vector.

An apparent drawback to cipher feedback is that decryption must process the ciphertext in correct sequence, and without errors. If the ciphertext is transmitted over a communications channel that is susceptible to errors, it is not at all obvious how to implement cipher feedback encryption. Bad data might have to be resent through the channel, but the bad data may have already caused a faulty modification of the cryptographic key. If the computer at the other end uses a faulty bit for feedback, then subsequent decryptions will fail.

One of the best file transfer protocols in the prior art is ZMODEM, a protocol developed and placed in the public domain by Omen Technologies. It works roughly as follows. If A wants to send a file to B, they communicate by sending frames to each other. A frame is a self-contained piece of information that is easily recognized and interpreted by another computer. To send the file, A and B send each other one or more frames as part of the initial handshaking, then A sends a sequence of data blocks containing the file contents, and finally A and B exchange frames to indicate completion of the transfer.

There are additional frames with special meanings, such as for cancelling the transfer or for requesting that a data block be resent. The frames have checksums to insure the accuracy of the frame commands and data blocks.

In ZMODEM jargon, a transmission starts when A sends a ZRQINIT frame to B. B responds by sending a ZRINIT frame. These frames include some bits for various options. A proceeds by sending a ZFILE frame with the file name and other file particulars. Unless A receives a frame from B requesting something different, A continues to send ZDATA frames with data blocks incorporating the file data, and finishes with a ZFIN frame.

Each frame includes a checksum used by the computer at the other end to check its validity. If a data block appears to have been corrupted, the receiver can send a ZRPOS frame requesting that the transmission be restarted at a particular point. Likewise, if a transfer was partially completed on an earlier connection, B can send a ZRPOS frame requesting that A skip to a later point in the file.

DETAILED DESCRIPTION OF THE INVENTION

This invention provides a simple way for computers to exchange files securely. It combines the ease of use of the Diffie-Hellman method with the universality of file transfer protocols.

The invention involves two or more computers connected by a communications channel. The channel may be insecure, i.e., subject to eavesdropping. The computers may be sending messages to each other in the clear, i.e., with no encryption or other attempt to disguise the messages.

The invention provides a way to send a particular file from one computer to others securely. The method is to combine a frame and block based file protocol with Diffie-Hellman key exchange.

Figure 1:
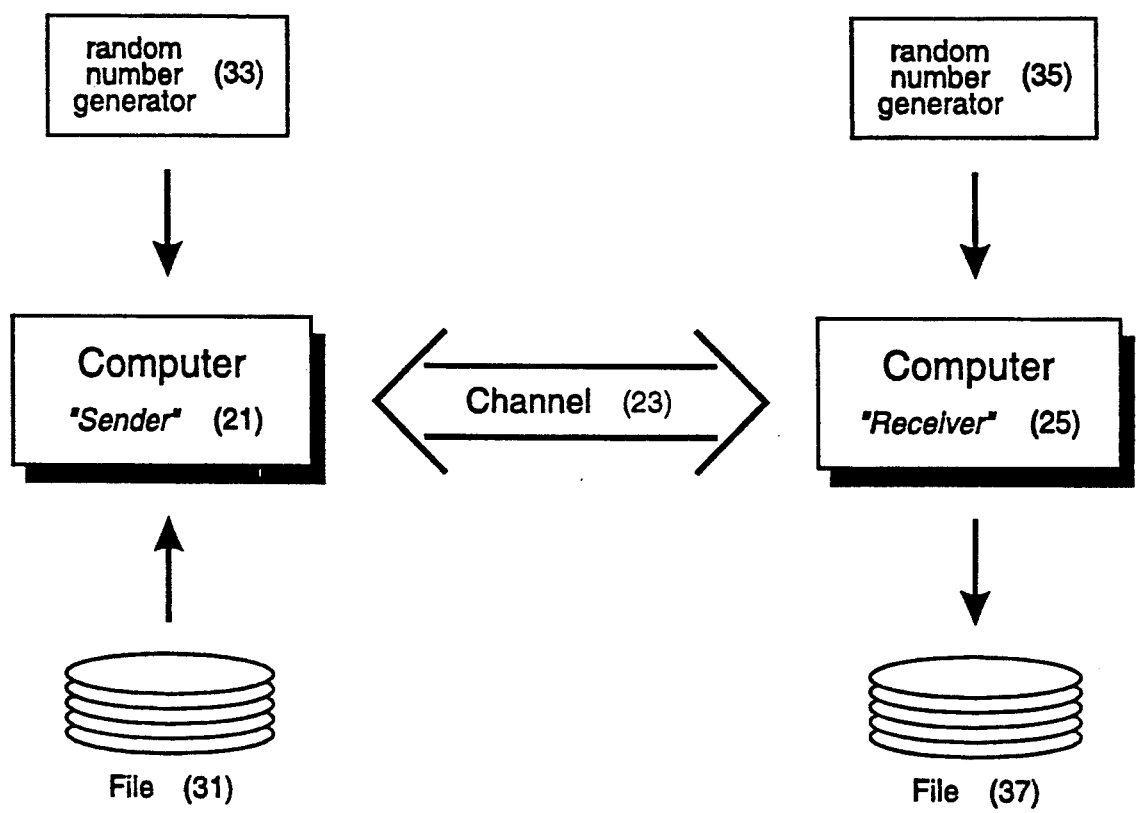
FIG. 1 shows the invention in block diagram form. It shows two computers connected to a communications channel, and configured to use this invention.

In the accompanying FIG. 1, the computers are designated as the sender (21) and the receiver (25). They can exchange data over the communications channel (23). The data in the channel usually goes one bit at a time, with the bits organized into 8-bit bytes.

The sender (21) accesses a file (31) in a storage device. Ultimately, this invention gives the means for transferring a copy of the file (31) to the file (37) in a storage device accessible by the receiver (25). For the purposes of this invention, a file may be considered an arbitrary sequence of bytes. A file may be read sequentially, one byte at a time, from beginning to end, and it may be written in the same manner. Only such sequential access is required for this invention.

The computers also access random number generators (33 and 35). These may generate random numbers on the spot as needed, or generate them in advance and save them in a storage device. In either case, the numbers should be random and secure, and not practical for an adversary to discover their values.

The security considerations of this invention are based on an adversary gaining access to the channel (23), but not the computers, files, or random number generators.

The file transfer protocol of this invention is based on frames and blocks.

Accordingly, it is an object of this invention to create a computer communications system which:
(a) allows efficient and reliable file transfer.
(b) can detect and correct transmission errors.
(c) can continue an aborted transmission.
(d) guards the files against eavesdroppers.
(e) minimizes user intervention.
(f) can be implemented in a wide variety of systems.

DESCRIPTION OF THE PREFERRED EMBODIMENT

The preferred embodiment uses parameters based on the proposed digital Signature Algorithm (DSA). These have been investigated by several agencies and found to be secure. In the current version of it, P is a 512-bit prime, and G is a 512-bit number such that $G \wedge q = 1$ mod Q and Q is a 160-bit prime. (There may be a revised version with different values.) The numbers P and G may be fixed for all users.

Random numbers are a little tricky to obtain on a computer, as the common pseudorandom number generators are not adequate. In the preferred embodiment, the user is prompted to type random keys, and the computer uses either the keys or the time between keystrokes as the basis for the random numbers.

The random numbers may be generated at the beginning of a file transfer, or generated in advance and stored in computer memory.

For the actual file encryption, the preferred embodiment uses the Data Encryption Standard (DES), using the 8-bit cipher feedback mode. This is specified in Federal Information Processing Standard 46 and 81. This method is particularly attractive because of its widely recognized security and its applicability to an arbitrary byte stream. Furthermore it can be implemented in hardware fast enough to keep up with most networks, and in software fast enough to keep up with most modems.

Random numbers may be generated in a variety of ways, such as from special purpose chips. The preferred embodiment of this invention bases the random numbers on keyboard input from the user. If the user is prompted to type random characters, the ascii values of those keys will be fairly random. Even better (more random) is the time between keystrokes.

The random numbers may be generated on the fly at the beginning of the file transmission, or they may be generated in advance and saved in a storage device. In the latter case, it is preferable to also precompute and save data which is needed later.

In an alternative embodiment, a pseudorandom number generator may be used in situations where the security requirements are more modest.

A particular embodiment of a pseudorandom number generator uses an initialization with random numbers, and uses the Secure Hashing Algorithm (SHA) to update them. Thus there is always an ample supply of random numbers for each file transmission, and the random numbers are not exhausted. The random numbers are updated based on the previous values of the random numbers and whatever other inputs to the system which have good randomness properties. In this context, system timing data are particularly attractive since timers are usually extremely precise (but often not very accurate) and communications are usually asynchronous. Hence the derived pseudorandom numbers will be a lot less predictable than with a typical pseudorandom number generator. The numbers can also be reinitialized at any time with random numbers.

The preferred embodiment uses a variant of ZMODEM. Essentially, it is the same as ZMODEM except that the file data is encrypted and that there are two new frame types, ZKEY and ZIV. The ZKEY frame is for the Diffie-Hellman key exchange and is part of the initial handshaking. After the ZRQINIT and ZRINIT frames, each computer sends a ZKEY frame with the Diffie-Hellman key $G \wedge a$ mod P.

With the Diffie-Hellman key, each computer can calculate $G \wedge (ab)$ mod P. Using DSA and DES parameters, this provides 512 bits of which 56 can be used for a DES key. A few of the remaining bits, say 32, can be used to verify that each computer calculated the session key correctly. One or more of the computers transmits the 32 bits and the others check that it agrees with what it calculated. If not, it can signal a restart or a cancellation.

A ZIV frame can be sent in any situation where there is doubt about what encryption initialization vector to use. This is particularly important after a ZRPOS frame, because these frequently follow an erroneous data block.

Sending such a ZIV frame has two advantages. First of all, it assures that the feedback vectors are synchronized. Second, it allows the sender to specify the initialization vector. Such a specification has data security advantages.

Resynchronization is important because, in the preferred embodiment, frames and data blocks are sent out without waiting for any acknowledgement. Not waiting gives maximum throughput. But when the sender gets a frame notifying it that a block was not received correctly and to restart at that point, the sender can't be sure how many frames or blocks were received correctly.

Normally, the initialization vector does not have to be secret. However some cryptographic methods have weaknesses if the same initialization vector is used repeatedly with the same key. Allowing one computer to specify the initialization vector neatly solves this problem, as it can choose a vector based on the time of day if that won't recur during transmission of the file. It could alternatively use sequence numbers or random numbers.

The initialization vector can be sent in the clear (i.e., unencrypted) even though an eavesdropper can detect it. The reason is that decryption requires the vector to be used in conjunction with the key, and the eavesdropper won't have the key.

Figure 2:
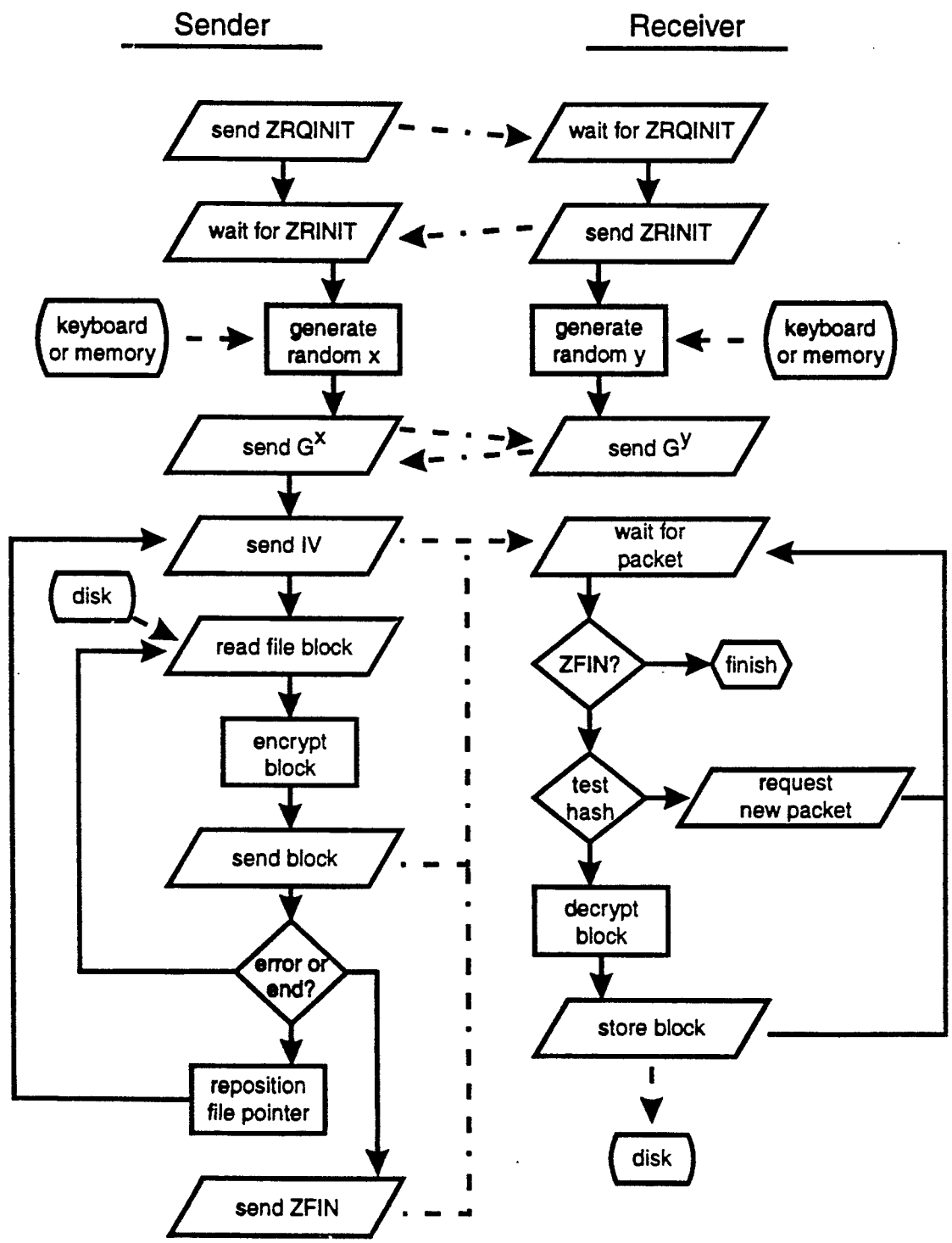
FIG. 2 shows a flow diagram of the file transfer protocol.

A flow diagram of the protocol is shown in FIG. 2. The SENDER follows the sequence of steps on the left to send a file to the RECEIVER, who follows the steps on the right. The SENDER initiates the transfer by sending a ZRQINIT packet, which the RECEIVER acknowledges by returning a ZRINIT packet. Both then access the keyboard, disk, or other memory device to generate a random sequence of bits., and then send g to that power. The SENDER creates a cryptographic initialization vector (IV) and sends it to the RECEIVER to synchronize the encryption module. Then the sender proceeds reading file blocks from the disk, encrypting them, and sending them to the RECEIVER. The SENDER repeatedly processes such blocks until it reaches the end of the file, in which case it sends a ZFIN packet and terminates, or it is notified by the RECEIVER that an error occurred, in which case it is repositions the file pointer, sends a new initialization vector (IV), and continues processing blocks. Meanwhile, the RECEIVER waits for blocks and processes them as they come in. On each packet, it tests the hash for a transmission error. If all is ok, it decrypts the block and stores it on the disk. Otherwise, it request a new packet and ignore packets until it gets a new IV and both ends are synchronized again. When it gets a ZFIN, the transfer is finished.

The scope of the invention should be determined by the appended claims and their legal equivalents.

We claim:

1. A file transfer system consisting of
a plurality of computers connected by a communications channel,
means for generating or retrieving random numbers in each of said computers,
means for digital handshaking between said computers to establish communications,
means for sending frames and data blocks through said channel, reliably and efficiently,
means for transmitting an encryption initialization vector frame in order to synchronize cipher feedback,
means for deriving a secure session key in each of said computers, based on said random numbers and on exchanged derived numbers,
means for encrypting data blocks using said cipher feedback,
means for detecting transmission errors,
means for resending variants of said encryption initialization vector frame and said frames and data blocks in case of said transmission errors,
means for sending an encrypted copy of a file or files based on said session key,
means for receiving said encrypted copy of said file or files, and
means for decrypting said received copy of said file or files.

2. The system of claim 1 further comprising means to record keystroke time intervals to generate said random numbers.

3. The system of claim 1 further comprising means to generate said random numbers in advance, precompute modular exponentials of said random numbers, and save both in a storage device.

4. The system of claim 1 further comprising means to update said random numbers based on a pseudorandom number generator and timing information.

5. The system of claim 1 wherein said encryption initialization vector frame is based on the time of day.

6. The system of claim 1 further comprising means to verify the key exchange by transmitting an otherwise unused portion of said session key.

7. The system of claim 1 further comprising means to generate and validate a digital signature for the purpose of authenticating one or more of said computers.

8. The system of claim 1 further comprising means to revert to a non-secure standard file transfer protocol under certain circumstances.

9. The system of claim 1 further comprising means to calculate and transmit secure hash functions in order to verify the integrity of frames or data blocks.

10. The system of claim 1 wherein said means for a deriving a secure session key involves each of said computers sending a modular exponential of said random number, where said modular exponentials conform to the Digital Signature Algorithm (DSA) and said encryption and decryption conforms to the Data Encryption Standard (DES).

11. A file transfer method consisting of
connecting a plurality of computers by a communications channel,
generating or retrieving random numbers in each said computer,
digital handshaking between said computers to establish communications,
sending frames and data blocks through said channel, reliably and efficiently,
transmitting an encryption initialization vector frame in order to synchronize cipher feedback,
deriving a secure session key in each of said computers, based on said random numbers and on exchanged derived numbers,
encrypting data blocks using said cipher feedback,
detecting transmission errors,
resending variants of said encryption initialization vector frame and said frames and data blocks in case of said transmission errors,
sending an encrypted copy of a file or files based on said session key,
receiving said encrypted copy of said file or files, and decrypting said received copy of said file or files.

12. The method of claim 11 further comprising recording keystroke time intervals to generate said random numbers.

13. The method of claim 11 further comprising generating said random numbers in advance, precomputing modular exponentials of said random numbers, and saving both in a storage device.

14. The system of claim 11 further comprising updating said random numbers based on a pseudorandom number generator and timing information.

15. The method of claim 11 further comprising basing said encryption initialization vector frame on the time of day.

16. The method of claim 11 further comprising verifying the key exchange by transmitting an otherwise unused portion of said session key.

17. The method of claim 11 further comprising generating and validate a digital signature for the purpose of authenticating one or more of said computers.

18. The method of claim 11 further comprising reverting to a non-secure standard file transfer protocol under certain circumstances.

19. The method of claim 11 further comprising verifying the integrity of frames or data blocks by calculating and transmitting secure hash functions.

20. The method of claim 11 wherein said method for a deriving a secure session key involves each of said computers sending a modular exponential of said random number, where said modular exponentials conform to the Digital Signature Algorithm (DSA) and said encryption and decryption conforms to the Data Encryption Standard (DES).

* * * * *